(12) United States Patent
Hanreich

(10) Patent No.: US 9,003,655 B2
(45) Date of Patent: *Apr. 14, 2015

(54) METHOD FOR MAINTENANCE AND REPAIR OF GAS TURBINES

(75) Inventor: Klaus Hanreich, Wedemark (DE)

(73) Assignee: MTU Aero Engines GmbH, Munich (DE)

( * ) Notice: Subject to any disclaimer, the term of this patent is extended or adjusted under 35 U.S.C. 154(b) by 2328 days.

This patent is subject to a terminal disclaimer.

(21) Appl. No.: 10/522,628

(22) PCT Filed: Mar. 29, 2004

(86) PCT No.: PCT/DE2004/000656
§ 371 (c)(1),
(2), (4) Date: Nov. 21, 2005

(87) PCT Pub. No.: WO2004/097180
PCT Pub. Date: Nov. 11, 2004

(65) Prior Publication Data
US 2006/0112552 A1 Jun. 1, 2006

(30) Foreign Application Priority Data

Apr. 27, 2003 (DE) .................................. 103 19 019

(51) Int. Cl.
*B23P 6/00* (2006.01)
*F01D 5/00* (2006.01)

(52) U.S. Cl.
CPC ................. *B23P 6/002* (2013.01); *F01D 5/005* (2013.01); *F05D 2230/80* (2013.01); *F05D 2230/70* (2013.01); *F05D 2230/60* (2013.01)

(58) Field of Classification Search
USPC ................. 29/889.1, 402.01, 402.03–402.04, 29/402.18, 564.1, 402.08, 281.6, 889.2, 29/890.01, 791, 429, 430, 783
See application file for complete search history.

(56) References Cited

U.S. PATENT DOCUMENTS

| | | | | | |
|---|---|---|---|---|---|
| 4,196,020 | A | * | 4/1980 | Hornak et al. | ............ 134/167 R |
| 4,953,277 | A | * | 9/1990 | Crispin et al. | ............ 29/407.05 |

(Continued)

FOREIGN PATENT DOCUMENTS

| | | | |
|---|---|---|---|
| DE | 690 15 461 T2 | 6/1990 | |
| DE | 694 01 958 T2 | 7/1994 | |
| EP | 708877 B1 * | 3/1997 | ............. F01D 25/28 |

OTHER PUBLICATIONS

International Search Report, Mar. 29, 2004.
International Preliminary Examination Report.

(Continued)

*Primary Examiner* — Ryan J Walters
(74) *Attorney, Agent, or Firm* — Crowell & Moring LLP

(57) ABSTRACT

A method for maintenance, in particular repair, of gas turbines, in particular aeroengines. Gas turbines are disassembled, with modules and/or assemblies and/or individual parts of the gas turbines then being inspected and/or repaired, and then assembled from inspected and/or repaired and/or new modules and/or assemblies and/or individual parts. The maintenance is subdivided into at least two repair steps, wherein modules and/or assemblies and/or individual parts to be repaired are moved through repair stations in order to move the modules and/or assemblies and/or individual parts of the or each gas turbine to repair stations adapted for this purpose in order to carry out the repair steps. The repair stations may be arranged in repair lines, with gas turbine modules, assemblies and/or individual parts being directed to different repair lines after inspection. The method permits gas turbine maintenance to be performed in a conveyer belt manner.

7 Claims, 4 Drawing Sheets

(56) References Cited

U.S. PATENT DOCUMENTS

| | | | |
|---|---|---|---|
| 5,193,272 A | | 3/1993 | Wortmann et al. |
| 5,285,572 A | | 2/1994 | Rathi et al. |
| 6,076,652 A | * | 6/2000 | Head, III .................. 198/341.07 |
| 6,769,162 B1 | * | 8/2004 | Barich et al. ................ 29/402.01 |
| 7,628,268 B2 | * | 12/2009 | Mueller et al. ............ 198/867.13 |
| 2002/0100159 A1 | * | 8/2002 | Swartz et al. .................... 29/430 |
| 2006/0272152 A1 | * | 12/2006 | Burmeister et al. .......... 29/889.1 |

OTHER PUBLICATIONS

Sawyer et al.: Turbomachinery Maintenance Handbook, 1980, Turbomachinery International Publications, Norwalk, Connecticut, USA XP002294741.

Bremer C: Kompressor-Und Turbinenschaufeln Automatisch Reparieren; Werkstatt Und Betrieb, Carl Hanser Verlag. Aug. 1, 1996, XP 000678763.

Serienmaessige Instandsetzung von Nockenwellen; Berlin 33 (1984); Dr. Ing. W. Tilgner.

* cited by examiner

METHOD FOR MAINTENANCE AND REPAIR OF GAS TURBINES

This application claims the priority of German application 103 19 019.8, filed Apr. 27, 2003, and PCT International Patent Application No. PCT/DE2004/000656, filed Mar. 29, 2004, the disclosure of which is expressly incorporated by reference herein.

BACKGROUND AND SUMMARY OF THE INVENTION

The invention relates to a method for maintenance, in particular repair, of gas turbines, that is to say aeroengines or stationary gas turbines.

The servicing and maintenance, in particular the repair, of gas turbines, in particular aeroengines, is becoming a critical factor when determining the direct operating costs of an aircraft. For example, approximately 30% of the direct operating costs of an aircraft can be attributed to the aeroengines, with about a third of the operating costs relating to the engines being attributed to the maintenance of the aeroengines. The costs for maintenance of aeroengines therefore amount to about 10% of the total direct operating costs of an aircraft. It follows directly from this that efficient and low-cost maintenance, servicing and repair of aeroengines is of critical importance to the airlines. A similar situation also applies to stationary gas turbines.

Until now, the maintenance and servicing of gas turbines, in particular of aeroengines, has been based on the so-called workshop principle. In the so-called workshop principle, the gas turbine, in particular the aeroengine, remains, at least in some cases, at one position or at one location. The material, tools and personnel required to carry out the work are made available for the gas turbine or the aeroengine at times such that as few disturbances as possible occur, and such that a promised maintenance time for the gas turbine, in particular the aeroengine, can be complied with.

The maintenance and servicing of gas turbines, in particular aeroengines, based on the so-called workshop principle, has the disadvantage, however, that the maintenance process does not follow a defined structure. In fact, work is carried out on the gas turbine or on the aeroengine in virtually any desired sequence so that disturbances and delays can occur in the maintenance of gas turbines or aeroengines, particularly when a number of them are being maintained at the same time. Maintenance based on the so-called workshop principle accordingly has the disadvantages that, on the one hand, there is no clear process structure and that, on the other hand, long times are required for maintenance and for servicing. This adversely affects the efficiency for maintenance of gas turbines, in particular aeroengines.

Against this background, the present invention is based on the problem of providing a novel method for maintenance, in particular repair, of gas turbines, in particular aeroengines, and of modules.

During the maintenance, in particular repair, of gas turbines, in particular aeroengines, gas turbines, in particular aeroengines, are disassembled. Modules and/or assemblies and/or individual parts of the gas turbines, in particular of the aeroengines, are then inspected and/or repaired. Gas turbines, in particular aeroengines, are subsequently assembled from inspected and/or repaired and/or new modules and/or assemblies and/or individual parts. According to the invention, the repair is subdivided into at least two repair steps, with modules and/or assemblies and/or individual parts to be repaired of at least one gas turbine being moved through repair stations in order to move the modules and/or assemblies and/or individual parts of the or each gas turbine to repair stations adapted for this purpose in order to carry out the repair steps.

The method according to the invention for maintenance, in particular repair, of gas turbines, in particular aeroengines, for the first time proposes that gas turbines, in particular aeroengines, be repaired on the basis of a so-called conveyor belt principle. One fundamental discovery with regard to the present invention in this case is accordingly that the conveyor belt principle is also suitable for repair work. The invention has overcome the previous prejudice that the conveyor belt principle is suitable only for new production of gas turbines, in particular aeroengines, but is not suitable for repairing them. This previous prejudice from the prior art is justified on the basis that a new article is produced from individual parts or raw materials with a defined characteristic during new production while, in contrast, an article with an unknown characteristic must be disassembled, inspected, repaired and then assembled during repair. In contrast to new production, the required work steps are not always the same for repairing gas turbines, in particular aeroengines, but are always dependent on the specific condition of the gas turbine or of the aeroengine to be repaired. However, the present invention in this case shows that a conveyor belt principle can be used successfully for the repair of gas turbines, in particular aeroengines, as well. The method according to the invention allows high repair efficiency and a short maintenance time. The method according to the invention for maintenance, in particular repair, of gas turbines, in particular aeroengines, is highly flexible.

According to one advantageous development of the invention, the modules and/or assemblies and/or individual parts are repaired in different repair lines, with a decision being made after inspection of the modules and/or assemblies and/or individual parts on the repair line to which a module and/or assembly and/or individual part to be repaired will be sent. The decision as to which of the repair lines a module and/or an assembly and/or an individual part will be passed to is mainly determined by the repair work to be carried out.

Two or more repair steps are preferably carried out in succession within one repair line, with the modules and/or assemblies and/or individual parts being moved on a cycle, that is to say discontinuously, to matched repair stations in order to carry out the repair steps.

In addition to the repair stations in the repair lines, central repair stations are provided, with modules and/or assemblies and/or individual parts from different repair lines being passed to the central repair stations. This ensures a high degree of process stability, since time-consuming tasks are carried out in central repair stations, and do not adversely affect the schedule within the repair lines.

According to one advantageous development of the invention, two or more identical repair stations are provided for at least some of the repair steps within the repair lines, so that it is possible to carry out the same repair steps on different modules and/or assemblies and/or individual parts at the same time within one repair line. This can shorten the repair line cycle time, and improves the efficiency of the method.

Other objects, advantages and novel features of the present invention will become apparent from the following detailed description of the invention when considered in conjunction with the accompanying drawings.

DETAILED DESCRIPTION

The method according to the invention for maintenance and servicing, in particular repair, of gas turbines will be described in greater detail, using the example of an aeroengine, with reference to FIGS. 1 to 4.

Figure 1:
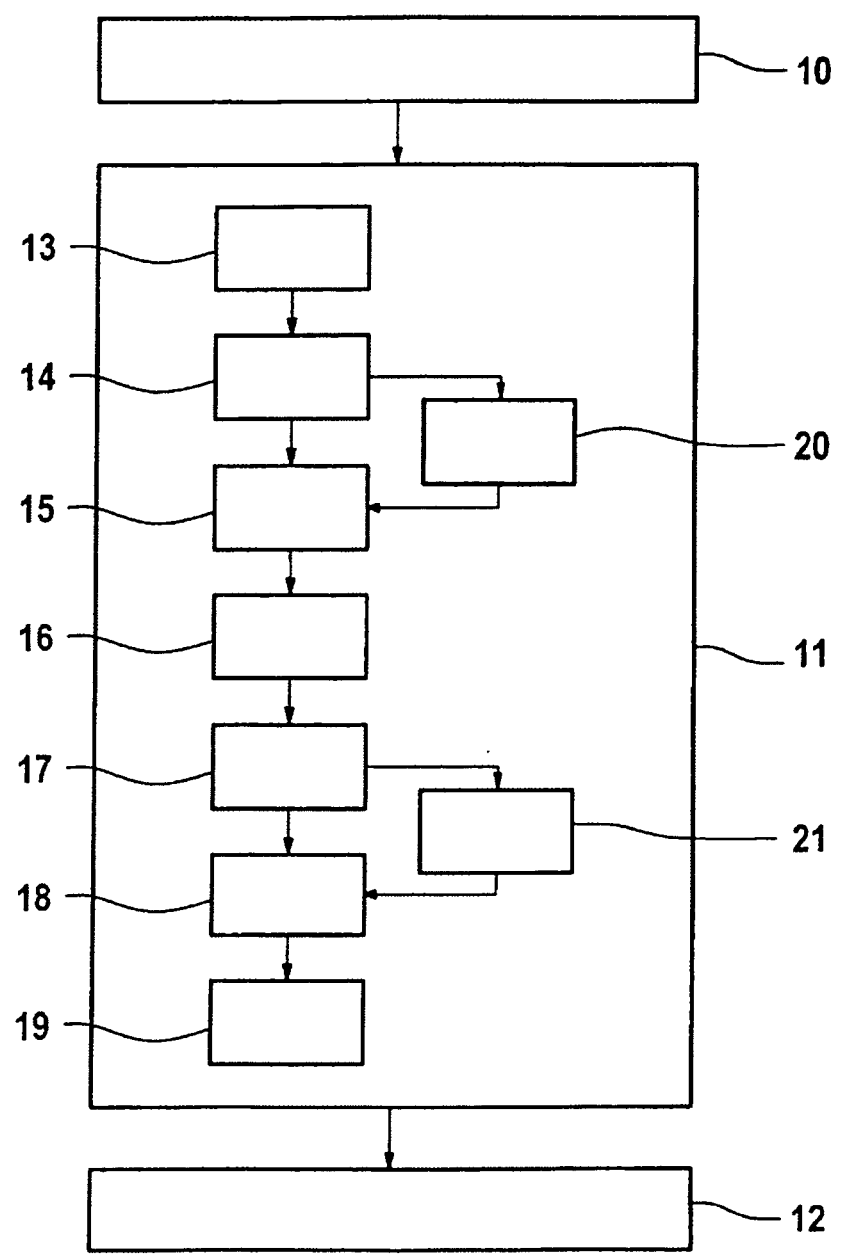
FIG. 1 shows a signal flowchart illustrateing the method according to an embodiment of the invention, comprising disassembly of an aeroengine, repair of modules and/or assemblies and/or individual parts of the aeroengine, and assembly of the aeroengine.
Figure 2:
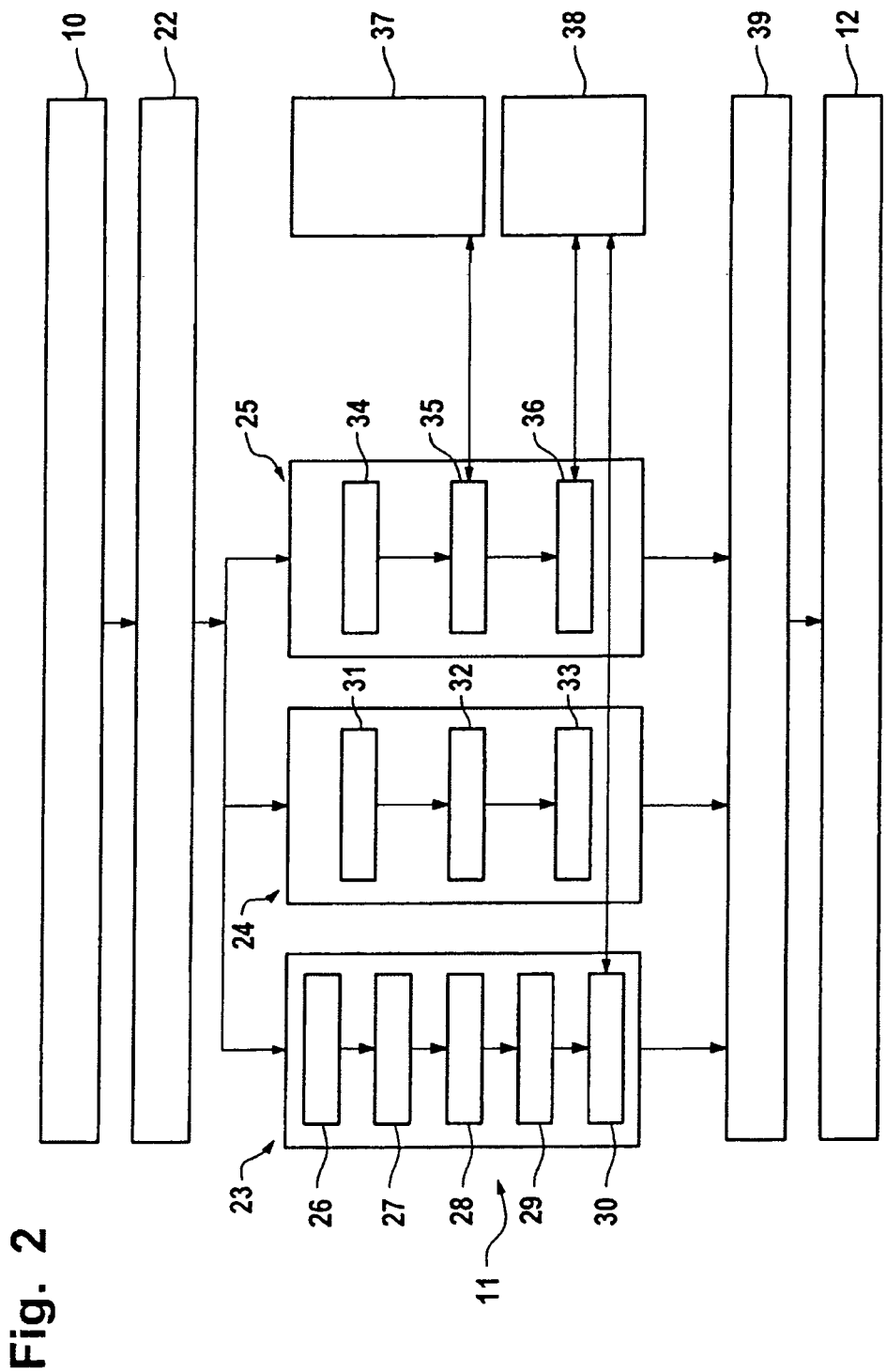
FIG. 2 shows a more detailed signal flowchart of one block from the signal flowchart shown in FIG. 1, in order to illustrate the repair of the aeroengine.
Figure 3:
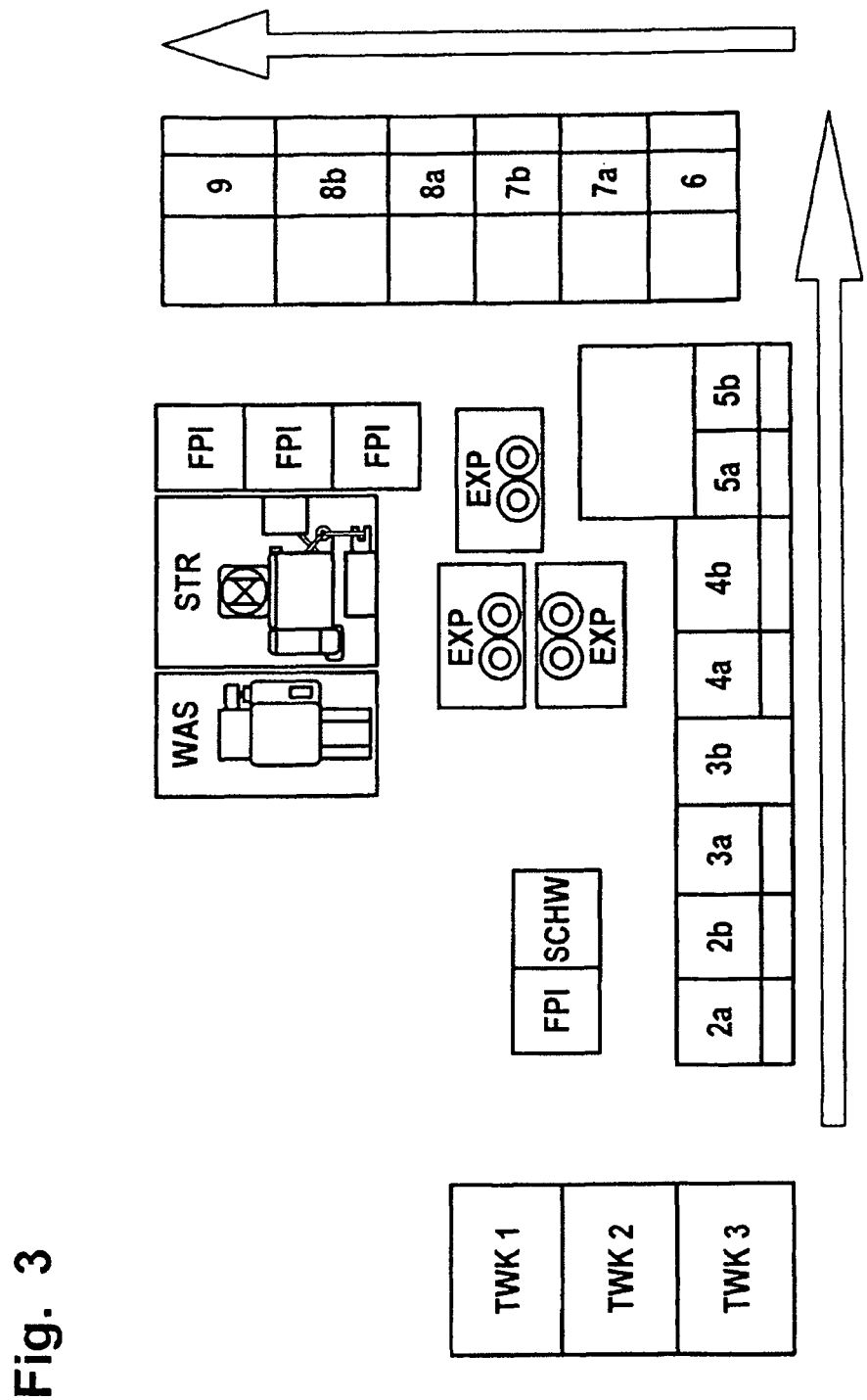
FIG. 3 shows a block diagram of one specific repair line.

FIG. 1 shows an embodiment of a highly schematic signal flowchart or block diagram of the method according to the invention. FIG. 1 thus shows the disassembly, repair and subsequent assembly of the aeroengine. FIG. 2 shows a more detailed block diagram relating to the actual repair of modules and/or assemblies and/or individual parts of an aeroengine, while FIG. 3 shows a more detailed block diagram of one specific repair line.

As is shown in FIG. 1, an aeroengine to be maintained is disassembled or broken down into modules and/or assemblies and/or individual parts in a first step 10. Step 10 is preferably preceded by cleaning of the aircraft engine.

Disassembly of the aircraft engine in accordance with step 10 is followed by a step 11, in which the modules and/or assemblies and/or individual parts of the aircraft engine are inspected and/or repaired. If the inspection process in step 11 finds that a module and/or an assembly and/or an individual part of the aircraft engine is not damaged, then, of course, it is not repaired.

The inspection and possible repair in the step 11 is followed in a step 12 by an aircraft engine being assembled. During the process of assembling the aircraft engine, an aircraft engine is assembled from inspected and/or repaired and/or new modules, assemblies and/or individual parts. Specifically, if it is found in the inspection in step 11 that a module, an assembly or an individual part of the aircraft engine can no longer be repaired, it is replaced by a new or as-new module, assembly or individual part.

The present invention in this case relates primarily to the repair of the modules, assemblies or individual parts of aircraft engines in the sense of step 11, and is independent of the disassembly and assembly.

According to the invention, the repair is subdivided into at least two repair steps, with modules and/or assemblies and/or individual parts to be repaired of at least one gas turbine being moved through repair stations in order to move the modules and/or assemblies and/or individual parts of the or each gas turbine to repair stations adapted for this purpose in order to carry out the repair steps. The modules and/or assemblies and/or individual parts to be repaired accordingly do not remain at one location or at one position, but are in fact moved through different repair stations, with their location being changed. Accordingly, it is within the scope of the invention for the maintenance or repair of aircraft engines to make use of the so-called conveyor belt principle for the first time.

FIG. 1 illustrates and visualizes the subdivision of the repair according to step 11 into different repair steps. Once an aircraft engine has been broken down into modules, assemblies or individual parts in step 10, a module, assembly or individual part to be repaired is then subjected to repair steps 13, 14, 15, 16, 17, 18 and 19. In order to carry out the repair steps 13 to 19, the module, assembly or individual part is moved through repair stations, which are arranged in succession, on a specific cycle. Each of the repair stations is matched to the repair step to be carried out, such that tools and materials which are required for the work are provided at the repair station.

In the exemplary embodiment illustrated in FIG. 1, the repair step 13 is a cleaning step for the module, assembly or individual part to be repaired. A crack test is carried out in the repair step 14, and welding work is carried out in the repair step 15 on the module, assembly or individual part to be repaired. Grinding work is carried out in the repair step 16, assembly work is carried out in the repair step 17, and drilling work on the module, assembly or individual part to be repaired is carried out in the repair step 18. In the illustrated exemplary embodiment, a final check of the repaired module, assembly or individual part is carried out in the repair step 19.

The individual repair steps 13 to 19 as well as the repair stations provided for this purpose define a clear process structure, and thus form a repair line. The sequence of the repair steps to be carried out is clearly defined and specified. Crossings and intersections in the process chain or repair line are avoided by means of the method according to the invention.

It is within the scope of the invention for the modules and/or assemblies and/or individual parts to be repaired to be moved through a repair line as shown in the block 11, which line is defined by the repair steps 13 to 19, as in the block 11, on a predetermined cycle. The cycle is in this case preferably matched to the repair steps to be carried out in the respective repair line.

As can be seen from FIG. 1, in addition to the repair steps 13 to 19 which are combined in one repair line and are carried out in repair stations which are arranged in succession, central repair steps 20, 21 can be carried out in central repair stations provided for this purpose, away from the repair line. The central repair stations are preferably used to carry out those central repair steps which are time-consuming and should not govern the cycle of a repair line. By way of example, these may be heat treatment processes, washing processes or electroplating processes. These central repair steps 20, 21 are carried out decoupled from the repair line, independently of the repair line and independently of the cycle of a repair line. This improves the stability of the overall repair method.

FIG. 2 illustrates the method according to the invention in greater detail. FIG. 2 thus once again shows the step 10 of disassembly of aircraft engines into modules and/or assemblies and/or individual parts. As already mentioned, step 10 is preceded by cleaning of the aircraft engines, with the aircraft engines being cleaned as one unit in this case.

A step 22 is provided after the step 10 and before the actual repair in the sense of step 11, in which the modules and/or assemblies and/or individual parts are subjected to an inspection. This inspection results in the modules and/or assemblies and/or individual parts to be repaired being passed to one of the repair lines 23, 24 or 25 illustrated in the exemplary embodiment shown in FIG. 2. The decision as to which of the repair lines 23, 24 or 25 a module, an assembly or an individual part to be repaired will be supplied to is mainly determined by the repair work to be carried out.

By way of example, in the exemplary embodiment shown in FIG. 2, the repair line 23 is a coating-intensive repair line, the repair line 24 is a welding-intensive repair line and the repair line 25 is a non-welding-intensive repair line. In addition to the repair lines mentioned by way of example here, further repair lines may, of course, be provided, for example a repair line for fan modules, fan-case modules or their assemblies or individual parts, a repair line for compressors, or a repair line for slightly damaged modules, individual parts or assemblies.

Each of the repair lines 23, 24 and 25 comprises two or more repair steps to be carried out in succession. In the repair line 23, a total of five repair steps 26, 27, 28, 29 and 30 are carried out in succession. In the repair line 24 and in the repair line 25, three repair steps 31, 32 and 33, as well as 34, 35 and 36, respectively, are carried out in succession. The number of repair steps is purely exemplary and may, of course, be varied.

In order to carry out the respective repair steps, the modules, assemblies or individual parts to be repaired are moved through repair stations, which are arranged in succession, in the respective repair lines 23, 24 and 25. Each of the repair lines operates on a predetermined cycle, although the cycles for the individual repair lines may differ from one another.

FIG. 2 also once again shows two central repair steps 37 and 38, which are carried out away from the respective repair lines 23, 24 and 25. One central repair station is once again provided for each central repair step 37, 38. The central repair stations may be supplied from all of the repair lines 23, 24 and 25 with modules and/or assemblies and/or individual parts to be repaired. This depends, of course, on whether the central repair steps to be carried out in the respective central repair station are of importance for a specific component to be repaired. Once a module, an assembly or an individual part to be repaired has been transferred from a repair line to a central repair station, the same component is returned, once the appropriate central repair step has been completed, to the repair line from which it was removed.

Once the repair has been carried out, the modules and/or assemblies and/or individual parts are subjected to a final inspection, in the sense of a step 39, to determine whether the repair has been carried out successfully.

Figure 4:
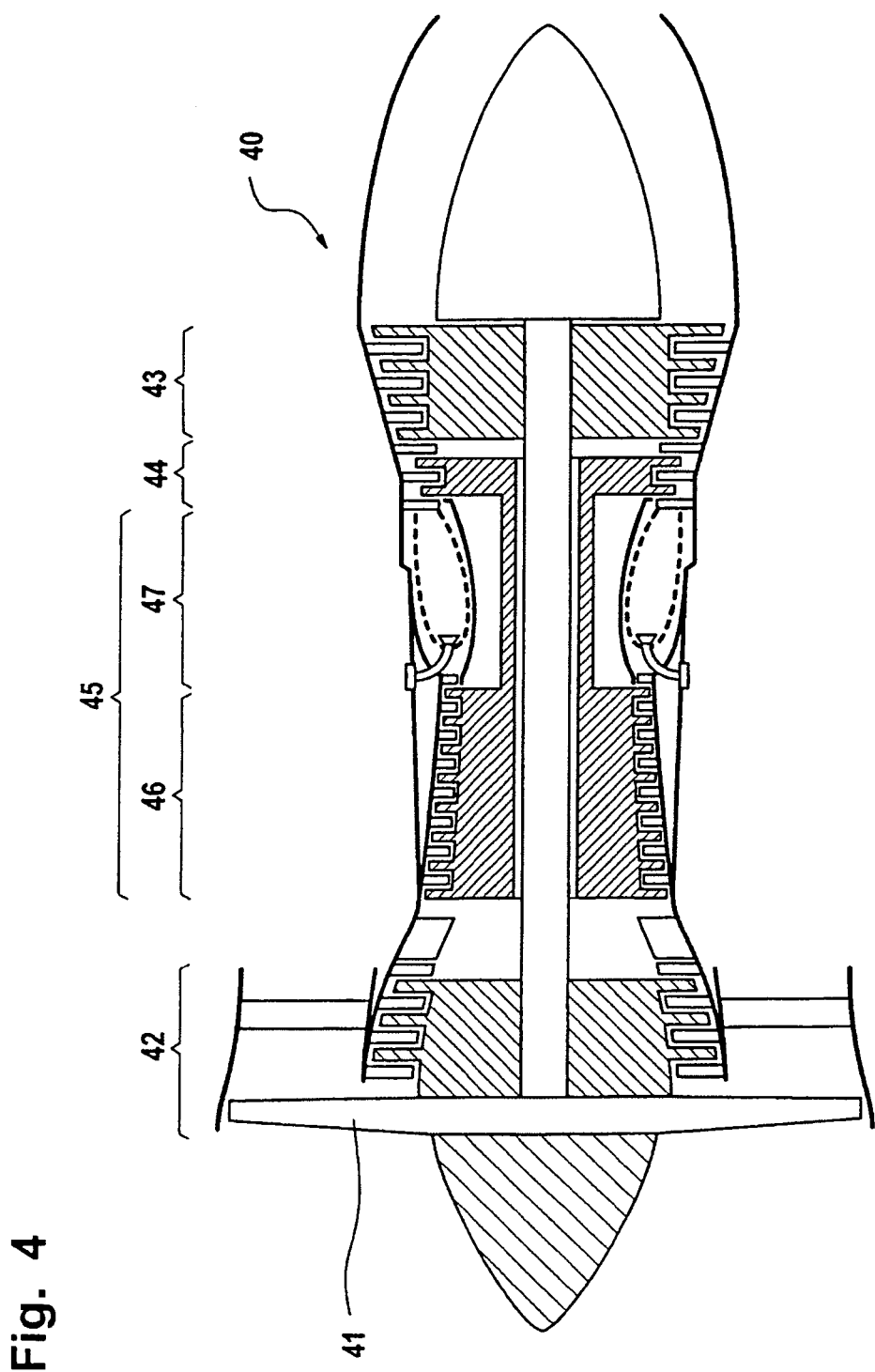
FIG. 4 shows a highly schematic cross section through an aeroengine to be repaired.

At this point, it should be noted that the method according to the invention allows modules and/or assemblies and/or individual parts of widely differing types of aircraft engines to be repaired on the basis of the conveyor belt principle. The aircraft engines whose modules can be maintained and repaired by the method according to the invention are production engines and are familiar to the appropriate person skilled in the art in this case. By way of example and in a highly schematic form, FIG. 4 shows modules or assemblies of an aircraft engine 40 to be repaired. The aircraft engine 40 shown in FIG. 4 has a main fan rotor module 41, a fan case module or fan module 42, a low-pressure turbine module 43, a high-pressure turbine module 44 and a high-pressure compressor module 45, whose assemblies comprise a high-pressure compressor 46 and a combustion chamber 47.

The structuring of the repair into repair lines, with the modules and/or assemblies and/or individual parts to be repaired being moved step by step through repair stations, which are arranged in succession, within the repair lines, results in a clear process structure. The times which are required for maintenance or repair of an aircraft engine can be planned better. Other parts can be included in the method according to the invention. The method according to the invention operates on a "first come, first served" principle. This means that a component which is the finish to be moved into the area of a specific repair station or central repair station is also the first to be worked on. Since the number of repair steps of each module, assembly or individual part to be repaired may vary depending on its state, this means that, of course, a component which has been passed to a repair line after another component may leave the repair line again before this component. The method according to the invention accordingly does not operate on a "first in, first out" principle. This considerably improves the effectiveness of the repair of aircraft engines.

FIG. 3 shows a block diagram of one specific repair line. By way of example, a total of fourteen repair stations 2a to 9 are arranged in succession in the exemplary embodiment shown in FIG. 3, with modules and/or assemblies and/or individual parts of aircraft engines to be repaired being moved in the direction of the arrows through the repair stations 2a to 9, to be precise depending on whether a module, assembly or individual part to be specifically repaired need be subjected to the repair step to be carried out in the respective repair station. Accordingly, a module, assembly or individual part to be repaired need not pass through all the repair stations.

The nomenclature for the repair stations shown in FIG. 3 shows that only eight of the fourteen repair stations 2a to 9 are used for carrying out different repair steps. For example, the repair stations 2a, 2b as well as 3a, 3b and 4a, 4b etc. are each used to carry out an identical repair step. Two or more identical repair stations are accordingly provided for some of the repair steps in one repair line. Accordingly, it is possible to carry out the same repair steps at the same time on different modules and/or assemblies and/or individual parts of different aircraft engines within one repair line. This ensures that the repair line cycle can be maintained even when a longer working time is required for some of the repair steps.

In addition to the repair stations 2a to 9, FIG. 3 shows further workstations. The workstations annotated FPI are used for optical crack testing on the modules and/or assemblies and/or individual parts to be repaired. The workstation annotated STR is a blasting system, in which surface processing can be carried out. The workstations which are annotated EXP are used to enlarge the diameter of the modules and/or assemblies and/or individual parts to be processed. The stations shown in the left-hand area of FIG. 3, and which are annotated TWK1, TWK2 and TWK3, are used for carrying out any disassembly work which may be required on modules and/or assemblies of the different types of aircraft engines. Furthermore, FIG. 3 shows a washing station for cleaning of modules and/or assemblies and/or individual parts, which is annotated WAS. Furthermore, an input buffer zone, which is not shown, may be provided as a buffer for modules, assemblies or individual parts which have been passed to the repair line. Areas may also be provided with stations for carrying out welding, drilling, assembling, measurement or adjustment tasks. A welding station is annotated SCHW.

For the first time, the invention proposes that a so-called conveyor belt principle be used for the repair, maintenance or servicing of aircraft engines. This overcomes the previous prejudice, which is known from the prior art, that a conveyor belt principle is not suitable for maintenance work or repair work.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for maintenance of gas turbines, wherein the gas turbines are disassembled into modules and/or assemblies and/or individual parts, the modules and/or assemblies and/or individual parts of the gas turbines are inspected to determine which modules and/or assemblies and/or individual parts require repair, and repairing the modules and/or assemblies and/or individual parts to be repaired, wherein the repair is subdivided into at least two repair steps, wherein modules and/or assemblies and/or individual parts to be repaired of at least one gas turbine are moved through repair stations adapted for the purpose of carrying out specific repair steps, wherein the modules and/or assemblies and/or individual parts are repaired in different repair lines containing repair stations, with a decision on the repair line to which a module and/or assembly and/or individual part to be repaired will be sent being made after inspection of the modules and/or assemblies and/or individual parts, wherein modules and/or assemblies and/or individual parts of gas turbines are moved discontinuously on a cycle through the selected repair stations or the repair lines, and wherein two or more repair steps are carried out in succession on the same modules and/or assemblies and/or individual parts within one repair line, wherein the modules and/or assemblies and/or individual parts are moved to at least one matched repair station in order to carry out the repair steps, wherein each matched repair station includes two or more identical repair stations provided for at least some of the repair steps, such that the same repair steps can be carried out at the same time on different modules and/or assemblies and/or individual parts within one repair line.

2. The method as claimed in claim 1, wherein the repair lines include at least one of a coating-intensive repair line and a welding-intensive repair line and a non-welding-intensive repair line.

3. The method as claimed in claim 1, wherein in addition to the repair stations in the repair lines, central repair stations are provided, wherein modules and/or assemblies and/or individual parts from different repair lines are passed to the central repair stations.

4. The method as claimed in claim 3, wherein the central repair stations include at least one of a heat treatment station, a washing station and an electroplating station.

5. The method as claimed in claim 1, wherein the modules and/or assemblies and/or individual parts are inspected after repair.

6. The method as claimed in claim 1, wherein before being disassembled, the gas turbines are precleaned as a unit, and in that the modules and/or assemblies and/or individual parts are cleaned again before repair.

7. The method as claimed in claim 1, wherein gas turbines are assembled from inspected and/or repaired and/or new modules and/or assemblies and/or individual parts after repair.

* * * * *